(12) United States Patent
Lin

(10) Patent No.: US 12,344,352 B2
(45) Date of Patent: Jul. 1, 2025

(54) DUAL-MOTOR DRIVING DEVICE FOR A VEHICLE

(71) Applicant: Kuo-Tsun Lin, Taichung (TW)

(72) Inventor: Kuo-Tsun Lin, Taichung (TW)

( * ) Notice: Subject to any disclaimer, the term of this patent is extended or adjusted under 35 U.S.C. 154(b) by 551 days.

(21) Appl. No.: 17/934,845

(22) Filed: Sep. 23, 2022

(65) Prior Publication Data

US 2023/0116195 A1    Apr. 13, 2023

(30) Foreign Application Priority Data

Sep. 30, 2021   (TW) .................................. 110136515

(51) Int. Cl.
| | |
|---|---|
| *B62M 6/55* | (2010.01) |
| *B62M 6/40* | (2010.01) |
| *B62M 6/50* | (2010.01) |
| *F16D 41/24* | (2006.01) |

(52) U.S. Cl.
CPC ................ *B62M 6/55* (2013.01); *B62M 6/40* (2013.01); *B62M 6/50* (2013.01); *F16D 41/24* (2013.01)

(58) Field of Classification Search
CPC .. B62M 6/40; B62M 6/50; B62M 6/55; F16D 41/24
See application file for complete search history.

(56) References Cited

U.S. PATENT DOCUMENTS

| | | | |
|---|---|---|---|
| 8,652,000 B2 * | 2/2014 | Wang ....................... | B62M 6/55 477/5 |
| 2017/0259883 A1 * | 9/2017 | Yamamoto .............. | F16H 3/724 |

FOREIGN PATENT DOCUMENTS

| | | | |
|---|---|---|---|
| CN | 203345148 U | * | 12/2013 |
| IT | 201900008541 A1 | * | 12/2020 |
| KR | 20040097861 A | * | 11/2004 |

* cited by examiner

*Primary Examiner* — Bobby Rushing, Jr.
(74) *Attorney, Agent, or Firm* — MLO, a professional corp

(57) ABSTRACT

A dual-motor driving device includes an input axle, a sleeve that is rotatable relative to the input axle, two rotors, a axle one-way clutch and a first rotor one-way clutch. Each of the rotors surrounds the sleeve. The axle one-way clutch is mounted between the input axle and the sleeve so that rotation of the input axle relative to the sleeve in a first rotating direction is prevented, and that rotation of the input axle relative to the sleeve in a second rotating direction opposite to the first rotating direction is permitted. The first rotor one-way clutch is mounted between the sleeve and one of the rotors so that rotation of the one of the rotors relative to the sleeve in the first rotating direction is prevented, and that rotation of the one of the rotors relative to the sleeve in the second rotating direction is permitted.

5 Claims, 5 Drawing Sheets

DUAL-MOTOR DRIVING DEVICE FOR A VEHICLE

CROSS-REFERENCE TO RELATED APPLICATION

This application claims priority to Taiwanese Invention Patent Application No. 110136515, filed on Sep. 30, 2021.

FIELD

The disclosure relates to a driving device for a vehicle, and more particularly to a dual-motor driving device for a vehicle.

BACKGROUND

A conventional bicycle driving unit disclosed in Chinese Utility Model Patent Publication No. CN203345148 includes an axle, two cranks, a first motor, a second motor and an output member (i.e., a sprocket set). The axle is co-rotatably connected to the cranks, a rotor of the first motor, a rotor of the second motor and the sprocket set, and is capable of transmitting power to drive the sprocket set to rotate when rotated by a user via the cranks, the first motor or the second motor.

However, because the axle is co-rotatably connected to the rotor of the first motor, the rotor of the second motor and the cranks, the user's legs are urged to move by the cranks according to rotation of the axle when the first motor and the second motor drive the rotation of the axle. Consequently, it becomes inconvenient for the user who wants to ride the bicycle without pedaling.

In addition, when the user rotates the cranks to urge the sprocket set to rotate, the rotors of the first motor and the second motor are driven by the rotation of the axle to rotate simultaneously. That is to say, the user has to rotate not only the axle but also the rotors of the first and second motors so as to urge the sprocket set to rotate, which makes the user spend more energy on pedaling and in turn will exhaust the user in a relatively short period of time.

Likewise, when one of the first and second motors drives the sprocket set to rotate via the axle, the other one of the first and second motors forms resistance such that the one of the first and second motors has to consume more electrical energy to drive the sprocket set.

SUMMARY

Therefore, an object of the disclosure is to provide a dual-motor driving device for a vehicle that can alleviate at least one of the drawbacks of the prior art.

According to the disclosure, the dual-motor driving device includes a transmitting unit, a first electric power unit, a second electric power unit and a transmission switch unit. The transmitting unit includes an input axle that is rotatable, and a sleeve that surrounds the input axle and that is rotatable relative to the input axle. The first electric power unit includes a rotor that surrounds the sleeve. The second electric power unit includes a rotor that surrounds the sleeve. The transmission switch unit includes at least one axle one-way clutch, at least one first rotor one-way clutch and at least one second rotor one-way clutch. The at least one axle one-way clutch is mounted between the input axle and the sleeve so that rotation of the input axle relative to the sleeve in a first rotating direction is prevented, and that rotation of the input axle relative to the sleeve in a second rotating direction opposite to the first rotating direction is permitted. The at least one first rotor one-way clutch is mounted between the sleeve and the rotor of the first electric power unit so that rotation of the rotor of the first electric power unit relative to the sleeve in the first rotating direction is prevented, and that rotation of the rotor of the first electric power unit relative to the sleeve in the second rotating direction is permitted. The at least one second rotor one-way clutch is mounted between the sleeve and the rotor of the second electric power unit so that rotation of the rotor of the second electric power unit relative to the sleeve in the first rotating direction is prevented, and that rotation of the rotor of the second electric power unit relative to the sleeve in the second rotating direction is permitted.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
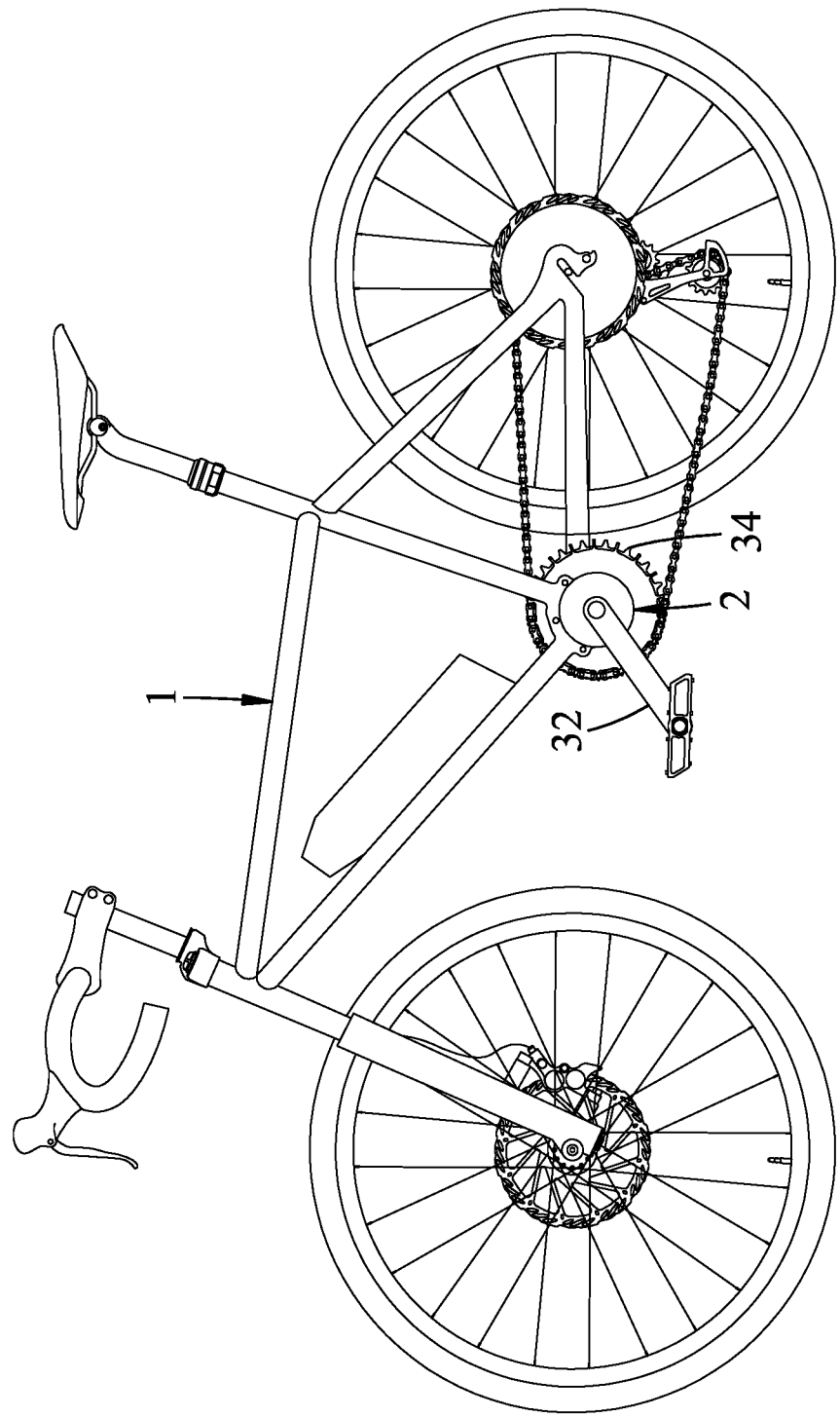
FIG. 1 is a side view of a vehicle mounted with an embodiment of a dual-motor driving device according to the disclosure.
Figure 2:
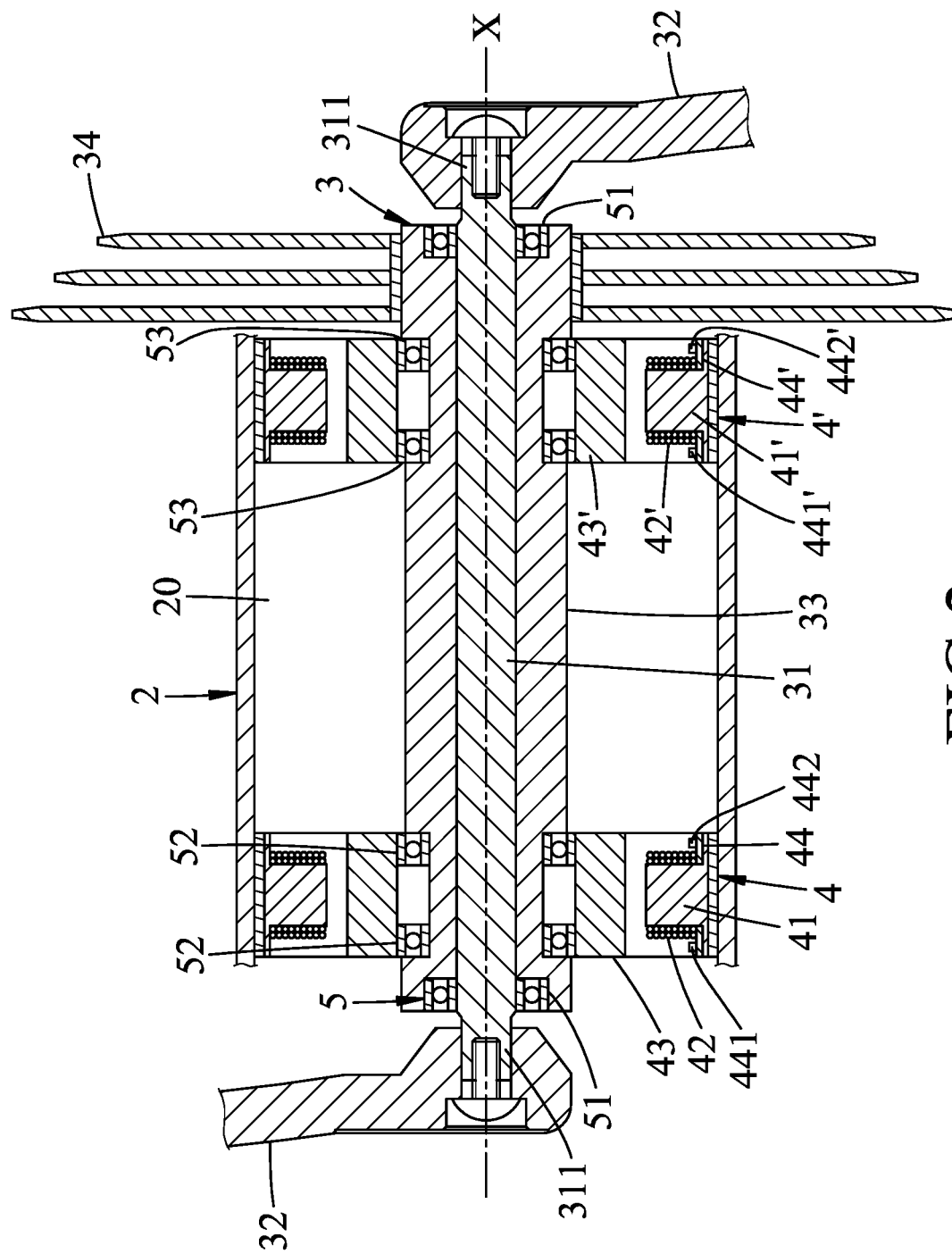
FIG. 2 is a fragmentary sectional view of the embodiment.

Referring to FIGS. 1 and 2, an embodiment of a dual-motor driving device according to the disclosure is adapted to be mounted to a frame of a vehicle 1. In this embodiment, the vehicle 1 is configured to be a bicycle. The dual-motor driving device includes a mounting frame 2, a transmitting unit 3, a first electric power unit 4, a second electric power unit 4' and a transmission switch unit 5.

The mounting frame 2 is adapted to be connected to the vehicle 1, accommodates the transmitting unit 3 and the first and second electric power units 4, 4', and defines an accommodating space 20 that has two opposite openings. In this embodiment, the mounting frame 2 is a shell that is mounted to the vehicle 1 by a plurality of fastening members.

The transmitting unit 3 includes an input axle 31, two cranks 32, a sleeve 33 and a sprocket set 34. The input axle 31 is rotatable and extends along an axis (X). The sleeve 33 surrounds the input axle 31 and is rotatable relative to the input axle 31. The sprocket set 34 is connected to the sleeve 33 and surrounds the sleeve 33. The input axle 31 is surrounded by the mounting frame 2 and has two opposite ends 311 that respectively extend through the openings of the mounting frame 2 in an extending direction of the axis (X). Each of the cranks 32 is connected to and surrounds a respective one of the ends 311 of the input axle 31, and co-rotates with the input axle 31.

Each of the first and second electric power units 4, 4' includes a stator 41, 41', a coil subunit 42, 42', a rotor 43, 43' and an electrical control subunit 44, 44'. Each of the stators 41, 41' is mounted in the accommodating space 20 of the mounting frame 2 and is capable of generating a magnetic field. The coil subunits 42, 42' are respectively wound on the stators 41, 41', and each of the coil subunits 42, 42' is for an electric current to travel therethrough. Each of the rotors 43, 43' surrounds the sleeve 33 and is urged by the magnetic field to transmit power provided by electrical energy to the sleeve 33. Each of the electrical control subunits 44, 44' includes an electrical control member 441, 441' and a Hall sensor 442, 442'. The electrical control members 441, 441' are respectively and electrically coupled to the coil subunit 42, 42', and are operable to adjust the electric current through the coil subunits 42, 42', respectively. The Hall sensors 442, 442' are respectively and electrically coupled to the electrical control members 441, 441', and each of which is capable of detecting a change in the magnetic field.

The transmission switch unit 5 includes at least one axle one-way clutch 51, at least one first rotor one-way clutch 52 and at least one second rotor one-way clutch 53. The axle one-way clutch 51 is mounted between the input axle 31 and the sleeve 33 so that rotation of the input axle 31 relative to the sleeve 33 in a first rotating direction is prevented, and that rotation of the input axle 31 relative to the sleeve 33 in a second rotating direction opposite to the first rotating direction is permitted (i.e., rotation of the sleeve 33 relative to the input axle 31 in the first rotating direction is permitted). The first rotor one-way clutch 52 is mounted between the sleeve 33 and the rotor 43 of the first electric power unit 4 so that rotation of the rotor 43 relative to the sleeve 33 in the first rotating direction is prevented, and that rotation of the rotor 43 relative to the sleeve 33 in the second rotating direction is permitted (i.e., rotation of the sleeve 33 relative to the rotor 43 in the first rotating direction is permitted). The second rotor one-way clutch 53 is mounted between the sleeve 33 and the rotor 43' of the second electric power unit 4' so that rotation of the rotor 43' relative to the sleeve 33 in the first rotating direction is prevented, and that rotation of the rotor 43' relative to the sleeve 33 in the second rotating direction is permitted (i.e., rotation of the sleeve 33 relative to the rotor 43' in the first rotating direction is permitted). In one embodiment, the transmission switch unit 5 may include a plurality of axle one-way clutches 51, a plurality of first rotor one-way clutches 52 and/or a plurality of second rotor one-way clutches 53.

It is noted that, each of the axle one-way clutch 51, the first rotor one-way clutch 52 and the second rotor one-way clutch 53 may include an inner annular member, an outer annular member and a plurality of teeth. Via an arrangement of the teeth, when one of the inner and outer annular members rotates in one of the first and second rotating directions, the inner and outer annular members engage with each other such that the rotation of the input axle 31, of the rotor 43 or of the rotor 43' relative to the sleeve 33 in the first rotating direction is prevented, and when the one of the inner and outer annular members rotates in the other one of the first and second rotating directions, the inner and outer annular members disengage from each other such that the rotation of the input axle 31, of the rotor 43 or of the rotor 43' relative to the sleeve 33 in the second rotating direction is permitted. There will be no further description for each of the axle one-way clutch 51, the first rotor one-way clutch 52 and the second rotor one-way clutch 53 since the structure and mechanism of a one-way clutch are widely-understood by those skilled in the art and may have various configurations.

Figure 3:
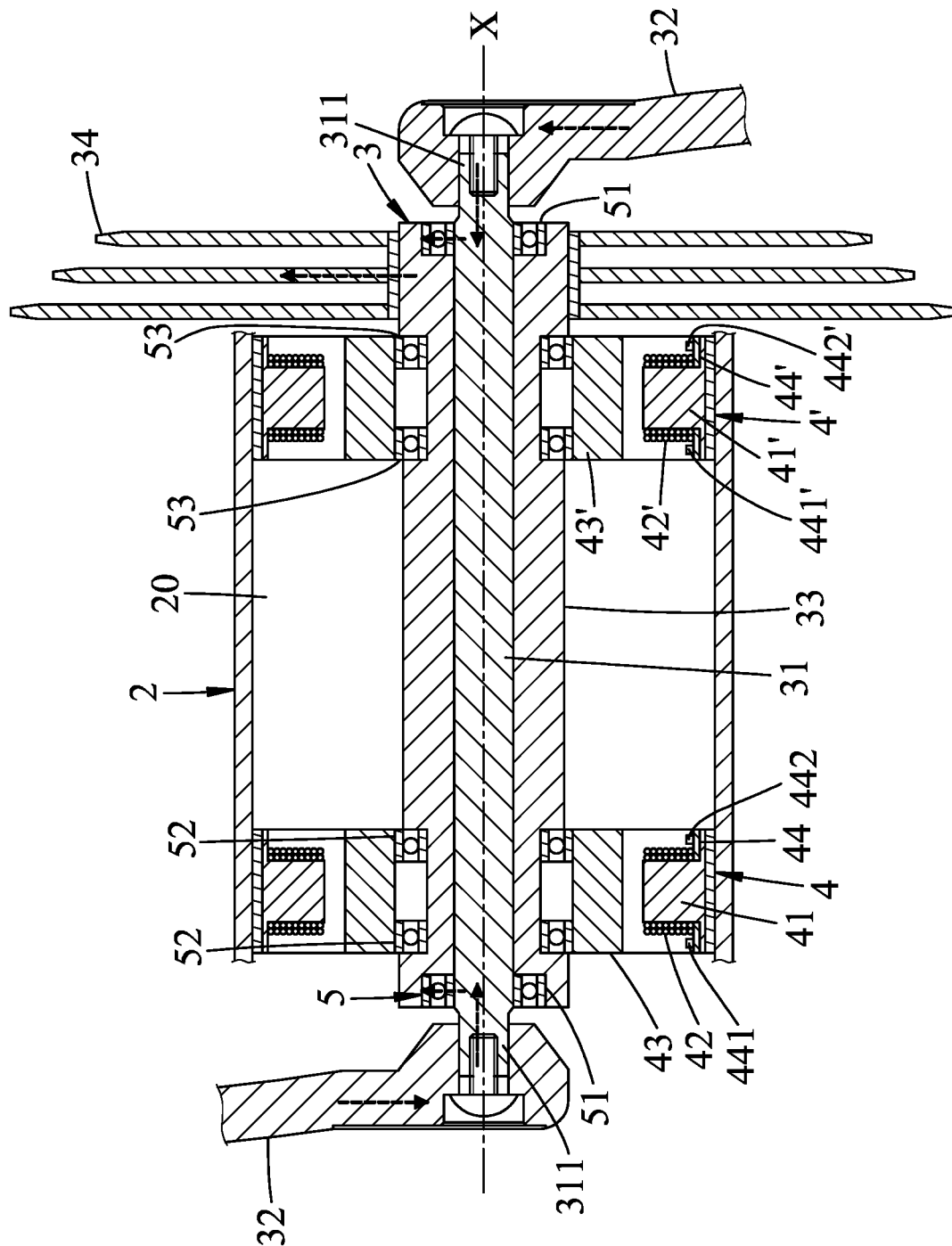
FIG. 3 is a view similar to FIG. 2, but illustrating that power is transmitted from an input axle of the embodiment to a sprocket set of the embodiment through a sleeve of the embodiment.

Referring to FIG. 3, because the cranks 32 are respectively and co-rotatably connected to the ends 311 of the input axle 31, when a user pedals to urge the cranks 32 to rotate about the axis (X) in the first rotating direction while the first and second electric power units 4, 4' are not energized, the input axle 31 simultaneously rotates about the axis (X) in the first rotating direction, and power generated by the user is transmitted to the input axle 31 through the cranks 32.

At this time, by virtue of the axle one-way clutch 51, the sleeve 33 is urged to co-rotate with the input axle 31 in the first rotating direction such that the power generated by the user is transmitted to the sleeve 33. The power that is transmitted to the sleeve 33 will urge the sprocket set 34 connected to the sleeve 33 to rotate. Since the rotation of the sleeve 33 relative to each of the rotors 43, 43' in the first rotating direction is permitted, the user does not need to urge the rotors 43, 43' to rotate when urging the sleeve 33 to rotate.

Figure 4:
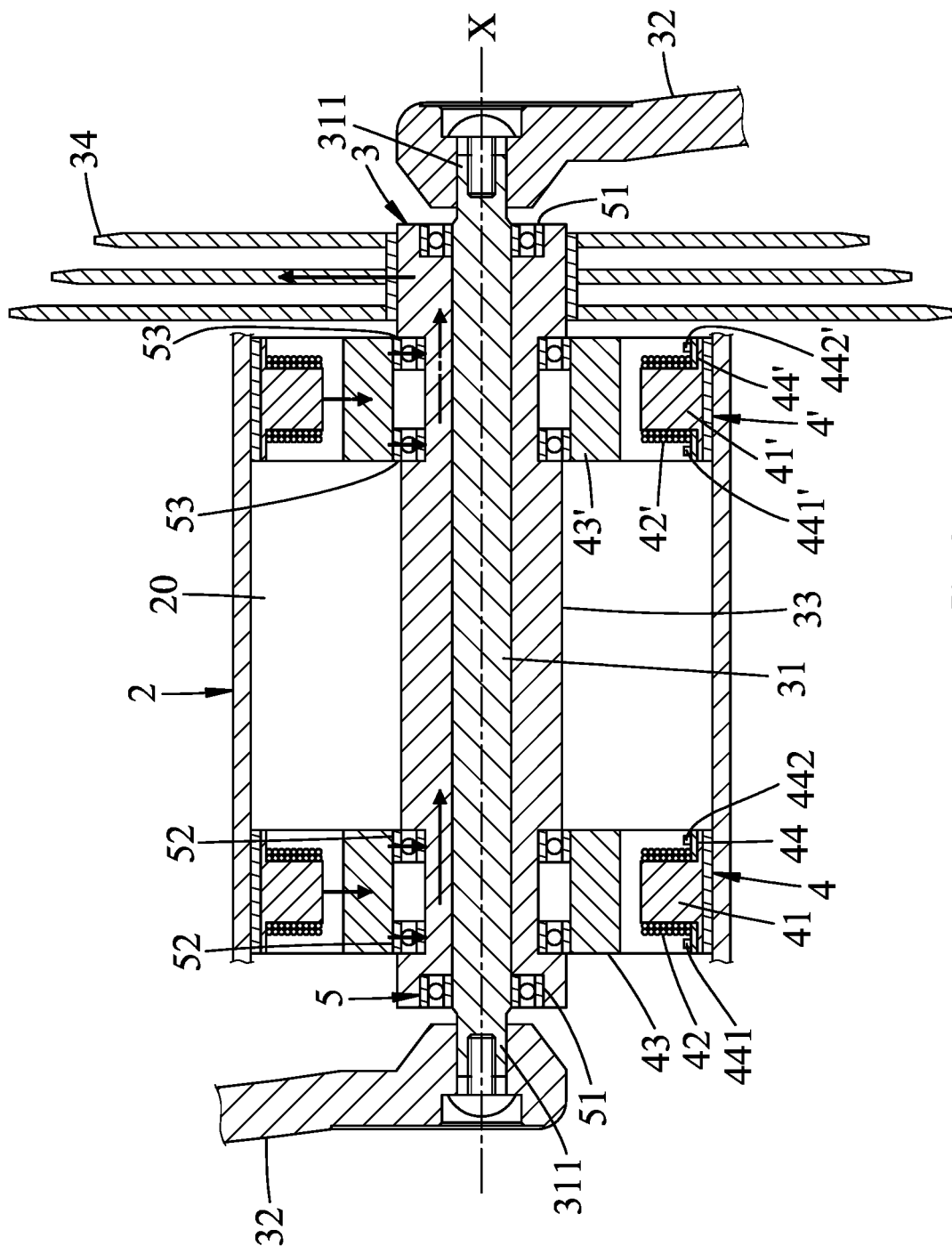
FIG. 4 is a view similar to FIG. 2, but illustrating that power is transmitted from motors of the embodiment to the sprocket set through the sleeve.

Referring to FIG. 4, when the rotor 43, 43' of one of the first and second electric power units 4, 4' is urged to rotate in the first rotating direction using electrical energy that is input into the one of the first and second electric power units 4, 4', by virtue of the corresponding one of the first and second rotor one-way clutches 52, 53, the sleeve 33 is urged to co-rotate with the rotor 43, 43' of the one of the first and second electric power units 4, 4' in the first rotating direction so that the sprocket set 34 is urged to rotate by electrical energy, At this time, electrical energy is not input into the other one of the first and second electric power units 4, 4'. Therefore, the rotor 43, 43' of the other one of the first and second electric power units 4, 4' may be stationary. Since the rotation of the sleeve 33 relative to the rotor 43, 43' of the other one of the first and second electric power units 4, 4' is permitted by the corresponding one of the first and second rotor one-way clutches 52, 53, the rotor 43, 43' of the other one of the first and second electric power units 4, 4' will not be urged to rotate by the sleeve 33. Moreover, since the rotation of the sleeve 33 relative to the input axle 31 in the first rotating direction is permitted by the axle one-way clutch 51, the user's legs will not be urged to move when the sleeve 33 is urged to rotate by the rotor 43, 43' of the one of the first and second electric power units 4, 4'. If the user does not pedal to urge the input axle 31 to rotate faster than the sleeve 33, the sleeve 33 will only be urged by the rotor 43, 43' of the one of the first and second electric power units 4, 4' to rotate.

It is noted that electrical energy may be input into both the first and second electric power units 4, 4'. In that case, the rotors 43, 43' are urged to rotate together in the first rotating direction so that the rotors 43, 43' may cooperatively urge the sleeve 33 to co-rotate. Consequently, the sprocket set 34 is urged to rotate by both the first and second electric power units 4, 4'.

Figure 5:
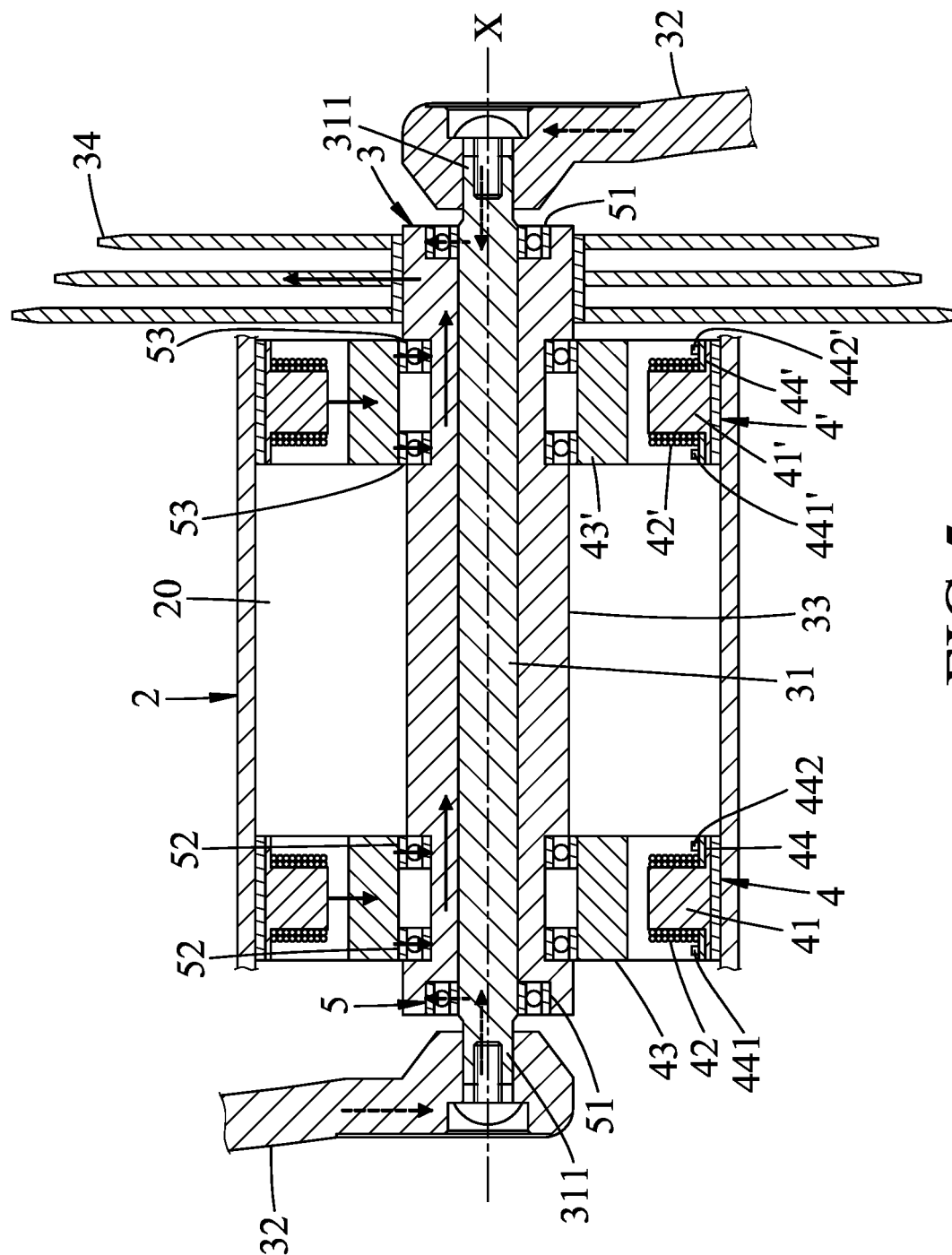
FIG. 5 is a view similar to FIG. 2, but illustrating that power is transmitted, either from the input axle or from the motors, to the sprocket set through the sleeve.

Referring to FIG. 5, when at least one of the rotors 43, 43' is urged to rotate in the first rotating direction with electrical energy, the user may also pedal to urge the cranks 32 to rotate. In that case, the sleeve 33 will be urged to rotate by the input axle 31 if the cranks 32 rotate faster than the rotors 43, 43', and will be urged to rotate by at least one of the rotors 43, 43' if one of the rotors 43, 43' rotates faster than the cranks 32. Thus, the user may decide how to advance the vehicle 1 based on the remaining physical strength of the user or the remaining amount of electrical energy.

It is noted that, for each of the first and second electric power units 4, 4', when the rotor 43, 43' urges the sleeve 33 to rotate, the Hall sensor 442, 442' will detect a change in the magnetic field so that the angular position of the sleeve 33 may be detected, and that the rotational speed of the sleeve 33 and the electric current around the sleeve 33 may be measured. Therefore, the electrical control subunit 441, 441' may adjust the electric current through the coil subunit 42, 42' according to the abovementioned data that are relevant to the sleeve 33 so that the vehicle 1 is user-friendly no matter how the user wants to advance the vehicle 1 (e.g., by the rotation of at least one of the motors 43, 43' or by the rotation of the input axle 31).

It should be noted that, the mounting frame 2 may not be limited to a shell that is mounted to the vehicle 1. In one embodiment, the mounting frame 2 may be, but not limited to, a portion of the vehicle 1 (e.g., a containing portion into which a conventional bottom bracket is threaded). Therefore, as long as the transmitting unit 3, the first and second electric power unit 4, 4' and the transmission switch unit 5 are accommodated in the mounting frame 2, the dual-motor driving device and the vehicle 1 may be assembled.

In summary, the embodiment of the dual-motor driving device offers several benefits as follows.

Because the input axle 31 and the cranks 32 do not rotate when the sleeve 33 is urged to rotate by electrical energy, the user may stop pedaling and rest by using electrical energy to advance the vehicle 1 instead.

When the user pedals to advance the vehicle 1 (i.e., not using electrical energy), the rotors 43, 43' will not be urged to rotate by the rotating input axle 31 and the sleeve 33. Therefore, the user does not need to spend his/her strength on rotating the rotors 43, 43' when pedaling.

Likewise, when the sleeve 33 is urged to rotate by only one of the rotors 43, 43', the other one of the rotors 43, 43', the input axle 31 and the cranks 32 will not be urged to rotate by the rotating sleeve 33. Therefore, electrical energy is saved from not rotating the other one of the rotors 43, 43', and the dual-motor driving device may minimize energy waste and energy cost.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A dual-motor driving device for a vehicle, said dual-motor driving device comprising:
    a transmitting unit including
        an input axle that is rotatable, and
        a sleeve that surrounds said input axle and that is rotatable relative to said input axle;
    a first electric power unit including a rotor that surrounds said sleeve;
    a second electric power unit including a rotor that surrounds said sleeve; and
    a transmission switch unit including
        at least one axle one-way clutch that is mounted between said input axle and said sleeve so that rotation of said input axle relative to said sleeve in a first rotating direction is prevented, and that rotation of said input axle relative to said sleeve in a second rotating direction opposite to the first rotating direction is permitted,
        at least one first rotor one-way clutch that is mounted between said sleeve and said rotor of said first electric power unit so that rotation of said rotor of said first electric power unit relative to said sleeve in the first rotating direction is prevented, and that rotation of said rotor of said first electric power unit relative to said sleeve in the second rotating direction is permitted, and
        at least one second rotor one-way clutch that is mounted between said sleeve and said rotor of said second electric power unit so that rotation of said rotor of said second electric power unit relative to said sleeve in the first rotating direction is prevented, and that rotation of said rotor of said second electric power unit relative to said sleeve in the second rotating direction is permitted.

2. The dual-motor driving device of claim 1, further comprising a mounting frame that accommodates said transmitting unit and said first and second electric power units, that is adapted to be connected to the vehicle, and that defines an accommodating space having two opposite openings, said input axle being surrounded by said mounting frame and having two opposite ends that respectively extend through said openings of said mounting frame.

3. The dual-motor driving device of claim 2, wherein said transmitting unit further includes two cranks that are respectively connected to said ends of said input axle.

4. The dual-motor driving device of claim 2, wherein each of said first and second electric power units further includes
    a stator that is mounted in said mounting frame and that is capable of generating a magnetic field,
    a coil subunit that is wound on said stator and that is for an electric current to travel therethrough, and
    an electrical control subunit that includes
        an electrical control member electrically coupled to said coil subunit and operable to adjust the electric current through said coil subunit, and
        a Hall sensor electrically coupled to said electrical control member and capable of detecting a change in the magnetic field.

5. The dual-motor driving device of claim 1, wherein said transmitting unit further includes a sprocket set that is connected to and surrounds said sleeve.

\* \* \* \* \*